July 25, 1950

A. C. MUELLER 2,516,793

SLIDE VIEWING DEVICE OR THE LIKE
AND SLIDE MAGAZINE THEREFOR

Filed Jan. 15, 1947

*INVENTOR.*
ARTHUR C. MUELLER
BY
Robert F. Miehle, Jr.
ATTY.

July 25, 1950 A. C. MUELLER 2,516,793
SLIDE VIEWING DEVICE OR THE LIKE
AND SLIDE MAGAZINE THEREFOR
Filed Jan. 15, 1947 3 Sheets-Sheet 2
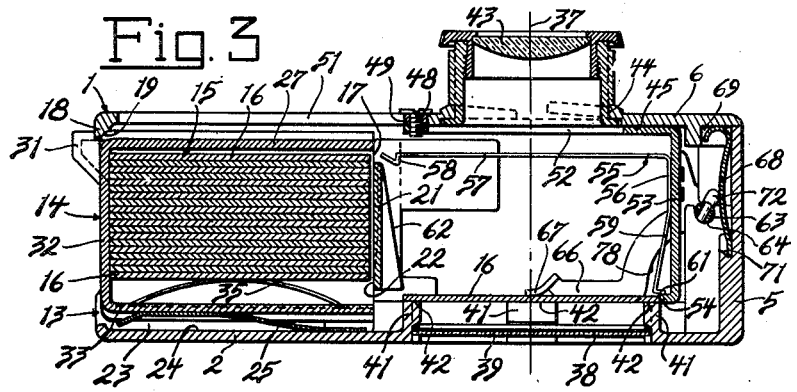
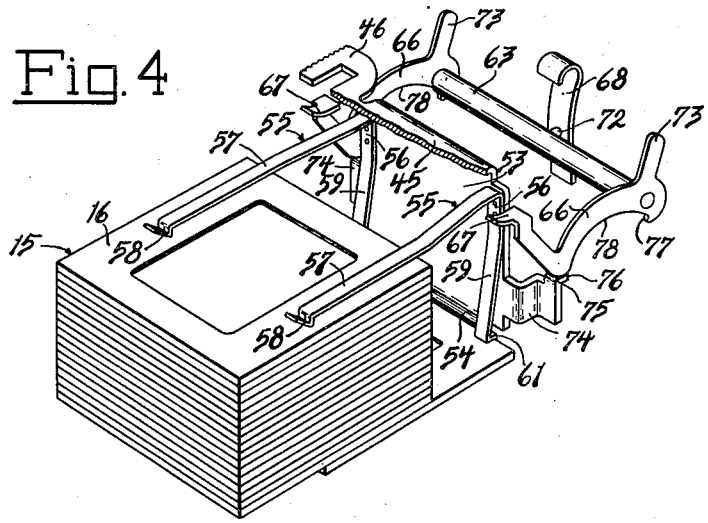
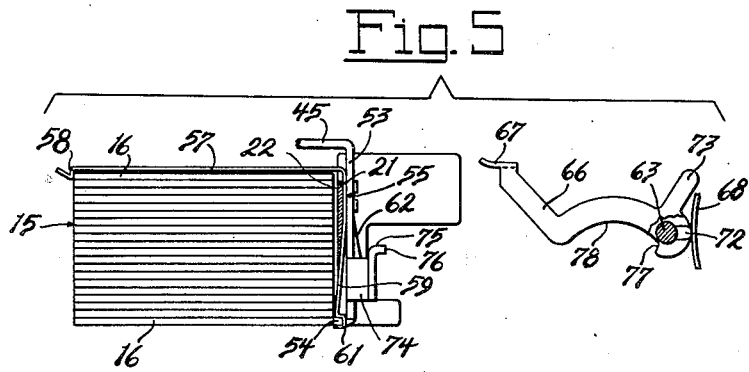
INVENTOR.
ARTHUR C. MUELLER
BY
Robert F. Miehle, Jr.
ATTY.

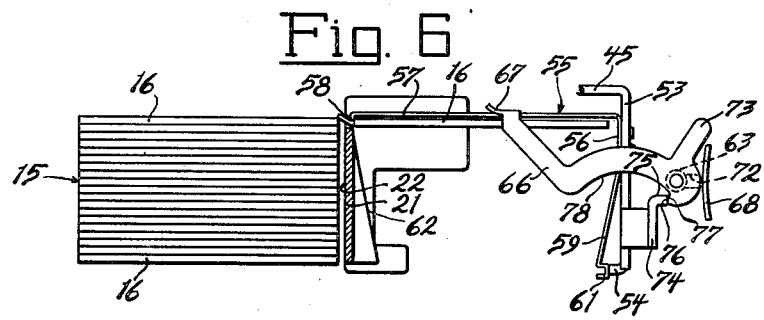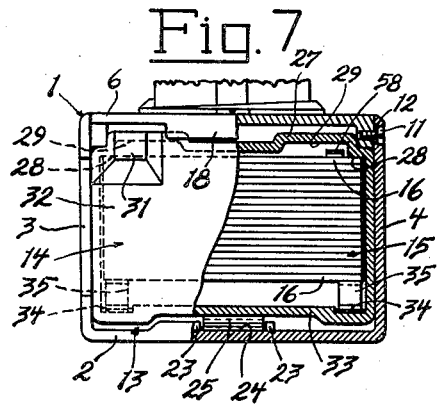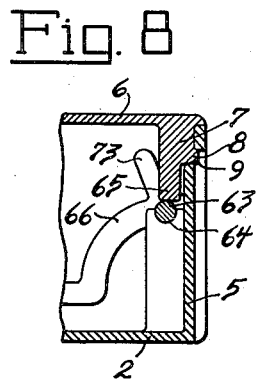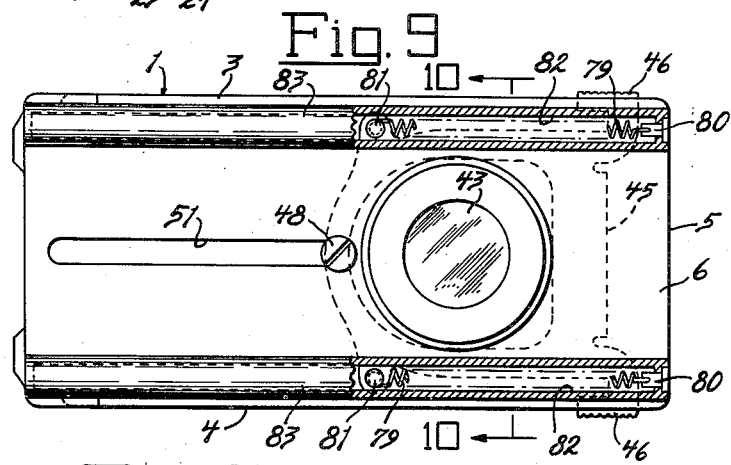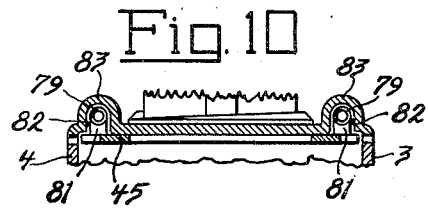

Patented July 25, 1950

2,516,793

UNITED STATES PATENT OFFICE 2,516,793

SLIDE VIEWING DEVICE OR THE LIKE AND SLIDE MAGAZINE THEREFOR

Arthur C. Mueller, Des Plaines, Ill., assignor to Bell & Howell Company, Chicago, Ill., a corporation of Illinois Application January 15, 1947, Serial No. 722,266

8 Claims. (Cl. 40—78)

My invention relates particularly to a slide viewing device for sequentially viewing photographic or transparency slides and more particularly to such a device of the hand type which is held to the eye and directed toward a light source for the viewing of the slides.

The general object of my invention resides in the provision of a novel, compact and conveniently operated slide viewing device for sequentially viewing a selected series of slides.

Other objects of my invention reside in the provision of a novel and effective slide transfer mechanism which is particularly adapted for a slide viewing device of the hand type, which is susceptible of compactness, which sequentially transfers slides from one end of a stack and onto the other end of the stack so that after transfer, the slides are stacked in the same order as before transfer, and which is particularly adapted for manual actuation.

The viewing device of my invention preferably embodies a slide magazine interchangeably mounted on the viewing device for conveniently interchanging different series of slides on the viewing device, and other objects of my invention reside in the provision of a novel and convenient slide magazine which is adapted for the transfer of slides from and to the magazine by the slide transfer means of my invention and which provides for the convenient interchange of different series of slides therein, and in the provision of a novel mounting for the magazine whereby it may be quickly and conveniently mounted on or removed from the viewing device.

The invention will be better understood by reference to the accompanying drawing forming a part hereof and in which:

Figure 3 is a sectional view substantially on the line 3—3 of Figure 2 showing the slide transfer mechanism in the same position of its cycle as that in which it is shown in Figure 2;

Figure 4 is a perspective view of the slide transfer mechanism with a part broken away and showing the mechanism in operative relation with a stack of slides and in another position of its cycle;

Figure 5 is a side elevation of the slide transfer mechanism with parts broken away and shown in section, and showing the mechanism in operative relation with a stack of slides and in another position of its cycle;

Figure 6 is a view similar to Figure 5 and showing the mechanism in another position of its cycle;

Figure 7 is an end elevation of the viewing device with parts broken away and shown in partial section;

Figure 8 is a partial sectional view substantially on the line 8—8 of Figure 2;

Figure 9 is a front elevation of a viewing device showing a modification of my invention and having the rear cover plate of the casing partially broken away and shown in section; and Figure 10 is a partial sectional view substantially on the line 10—10 of Figure 9.

Figure 1:
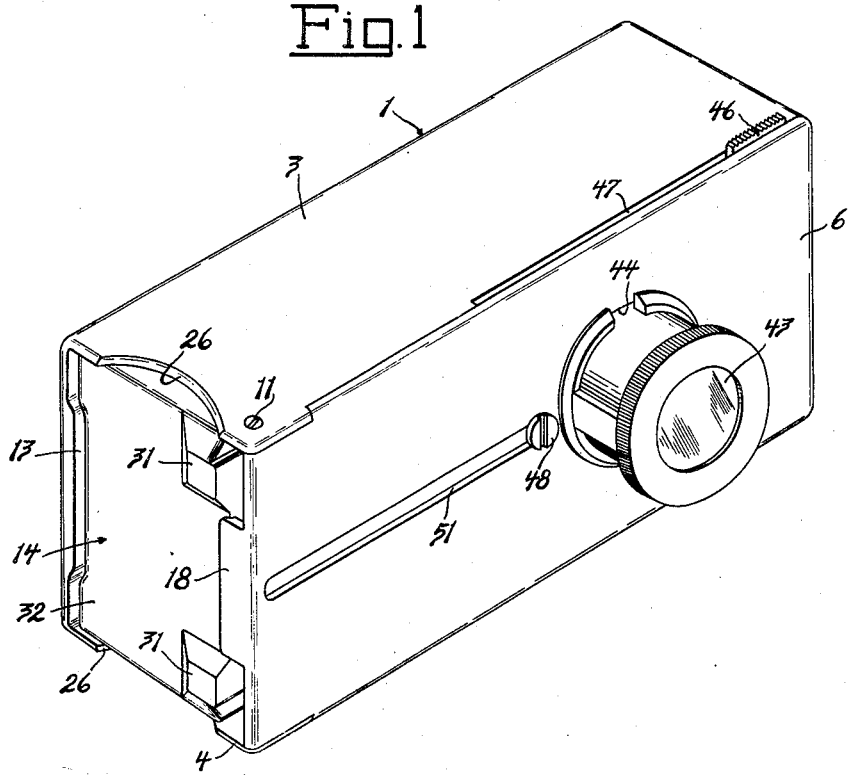
Figure 1 is a perspective view of a viewing device embodying my invention.

Referring to the drawing, an elongated rectangular casing, generally designated at 1, comprises a main casing portion comprising a rear wall 2, two opposite side walls 3 and 4 and an end wall 5, and a separate front wall 6 detachably secured on the main casing portion by means of the front wall facewise engaging against the side and rear casing walls, projections 7, see Figure 8, on and projecting inwardly from the front casing wall 6 and spaced laterally thereof and disposed adjacent the end casing wall 5 and provided with correspondingly spaced lugs 8 engaging in apertures 9 through the end casing wall to secure the corresponding end of the front casing wall on main casing portion, and headed screws 11, see Figures 1 and 7, respectively passing through apertures 12 through the side casing walls 3 and 4 at the other end of and screwthreaded into the front casing wall.

Figure 2:
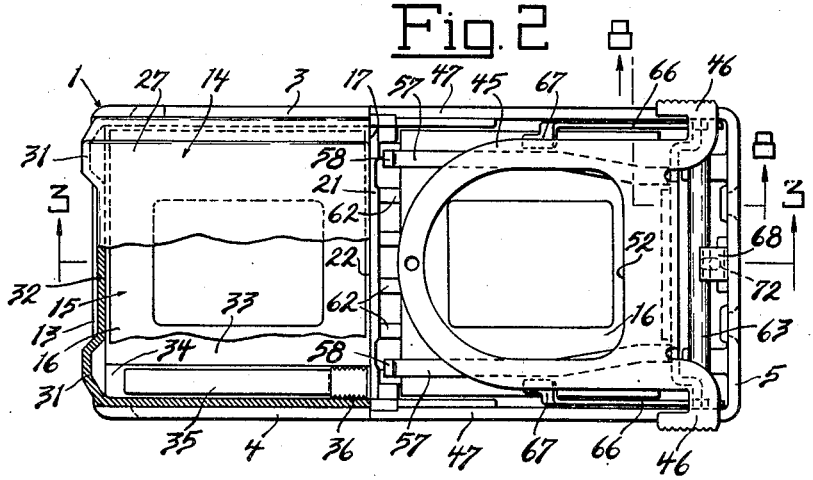
Figure 2 is a front elevational view of the same with the front wall of the viewer casing removed, with the slide magazine broken away and shown in partial section and with the stack of slides in the magazine broken away, this view showing the slide transfer mechanism of the viewing device in one position of its cycle.

The end of the casing opposite the end wall 5 is open, as designated at 13, for the insertion of a slide magazine 14 in and the removal of the same from the casing, see particularly Figures 1 and 3, and the magazine, see Figures 2, 3 and 7, is of generally rectangular shape and is adapted to contain a stack 15 of facewise engaged rectangular photographic or transparency slides 16 of standard form, and is open at one end, as designated at 17, for the insertion and removal of slides. The magazine is insertable in and removable from the casing through the open casing end 13, and is inserted in the casing with the open end 17 directed toward the closed end of the casing.

When the magazine is inserted in the casing, the two opposite side walls 3 and 4 of the casing closely confine the magazine parallel to the front and rear casing walls 6 and 2, while the front and rear casing walls are so spaced that the magazine has limited movement normal thereto. The front casing wall 6 is provided at the end casing opening 13 with a lip 18 directed toward the rear casing wall, see Figures 1, 3 and 7, which lip though it restricts the casing opening, nevertheless permits the magazine to pass through the casing opening, and this lip provides a shoulder 19 disposed at the rear wall side of the casing opening and facing inwardly of the casing opening and into and out of engaging relation with which the magazine is movable laterally of the casing.

A cross member 21, see Figures 2 and 3, which is suitably secured with the main casing portion, extends across between the casing side walls 3 and 4 intermediate the ends of the casing and in spaced relation with the front and rear casing walls 6 and 2, and provides a shoulder 22 directed toward and spaced inwardly from the casing opening 13 and the shoulder 19, the casing being thus provided internally thereof with opposing shoulders spaced longitudinally thereof and adapted to confine the magazine therebetween, and the magazine being movable laterally of the casing into and out of engaging relation with the shoulder 19 for removably predeterminately positioning the magazine in the casing.

The rear casing wall 2 is provided, between the casing opening 13 and the cross member 21, with parallel ridges 23 extending longitudinally of the casing intermediate the casing side walls 3 and 4 and forming a channel 24 therebetween, and a bow spring 25 extends longitudinally of and has its ends engaged in this channel and has the intermediate portion thereof engageable against the opposing side of the magazine to yieldable position the magazine in engaging relation with the shoulder 19 to provide convenient insertion of the magazine in and removal of the same from the casing, the ends of the side walls 2 and 3 at the open end of the casing being recessed, as designated at 26, in Figure 1, to provide a finger hold on the magazine for removing it from the casing, and one end of the spring 25 being suitably secured on the casing to hold it in place.

When the magazine is thus removably predeterminately positioned in the casing, the slide stack 15 within the magazine is disposed normal to the front and rear casing walls 6 and 2 of the casing, see particularly Figure 3, and the open end of the magazine being directed toward the end casing wall 5 and the cross member 21 being spaced from the front and rear casing wall, slides 16 may be transferred from the front casing wall adjacent end of the slide stack and onto the rear casing wall adjacent end of the slide stack as hereinafter described.

The side wall 27 of the magazine which is adjacent the front casing wall 6, see Figures 3 and 7, is provided with an internal positioning surface, comprising two spaced surface portions 28 disposed respectively in the regions of opposite side margins of this side wall and extending inwardly from the open end 17 of the magazine, against which one end of the slide stack 15 is engageable, and is also provided with two spaced channels 29 recessed from the positioning surface comprising the surface portions 28 and disposed respectively in the regions of opposite side margins of the side wall 27 and extending inwardly from the open end 17 of the magazine and beyond the side of the slide stack adjacent the closed end wall 32 of the magazine for a purpose hereinafter appearing, these channels being extended beyond this side of the stack by means of outward extrusions 31 of the closed end wall 32 of the magazine.

The side wall 33 of the magazine which is adjacent the rear casing wall 2 and which is opposite the magazine side wall 27, see Figures 2, 3 and 7, is provided with two spaced internal channels 34 disposed respectively in the regions of opposite side margins of this side wall and extending inwardly from the open end 17 of the magazine, and two bow springs 35 extend longitudinally of and respectively have their ends engaged in the channels 34 and have their intermediate portions engageable against the end of the slide stack opposite that which is engageable against the positioning surface comprising the surface portions 28 to press the stack against this positioning surface, it being observed that the springs 35 are adapted to permit the insertion of a slide 16 between them and the adjoining end of the stack by way of the open end 17 of the magazine. Each spring 35 has one end thereof suitably secured in its channel 34, as designated at 36 in Figure 2, to hold it in place.

When the magazine 14 is positioned in the casing it is disposed in the region of the open end thereof, and viewing station forming means is carried by the casing and has its axis, designated at 37 in Figure 3, in the region of the other or closed end of the casing and parallel to the slide stack 15.

The viewing station forming means comprises, see Figure 3, a translucent diffusing screen 38 secured in and extending across an opening 39 through the rear casing wall 2, a series of projections 41 on and projecting inwardly from the rear casing wall and spaced about the opening 39 and the inner end surfaces 42 of which projections form a slide positioning surface within the casing and disposed normal to the viewing station axis and directed toward the front casing wall 6, and a viewing lens 43 carried for axial focusing adjustment on the front casing wall in a manner unnecessary to be described and axially alined with an opening 44 through the front casing wall and through which a slide 16, facewise engaged on the positioning surface formed by the surfaces 42 and illuminated by light passing through the screen 38, may be viewed.

The magazine 14, as positioned in the casing, positions the slide stack 15 at the side of the viewing station with the slides 16 disposed normal to the viewing station axis 37 and with the end of the slide stack which is engaged by the springs 35 in the region of the slide positioning surface comprising the surfaces 42 and with this slide positioning surface facing in the direction of the other end of the slide stack which engages against the stack positioning surface of the magazine comprising the surface portions 28.

The slide transfer mechanism of the device is disposed within the casing and defines a generally U-shaped slide transfer path and is operative to sequentially transfer the slides 16 first edgewise transversely of the slide stack 15 from the end thereof adjoining the stack positioning surface comprising the surface portions 28, then facewise lineally of the slide stack to the viewing position thereof against the slide positioning surface comprising the surfaces 42 and finally edgewise transversely of the slide stack onto the other end thereof which is engaged by the springs 35 and between this stack end and these springs, and this mechanism will now be described.

A carrier 45 is formed of flat material and extends in a plane normal to the viewing station axis 37 and is disposed immediately inward of the front casing wall 6, see Figures 2 and 3, and the carrier is mounted on the casing for reciprocation longitudinally of the casing and normal to and across the viewing station axis by means of extensions 46 at one end of the carrier and extending laterally from opposite sides thereof and slidably engaged in slots 47 through the side casing walls 3 and 4 immediately inward of the front casing wall 6 and extending longitudinally of the casing and formed by inwardly stepped portions of the front casing wall adjoining edges of the side casing walls 3 and 4 cooperating with the front casing wall to form these slots as is apparent in Figure 1, and a headed screw 48 engaged through a bearing collar 49 and screwthreaded into the carrier at the other end and intermediate the sides thereof and a slot 51 through the front casing wall and extending longitudinally of the casing and in which the collar 49 is slidably engaged and through which the screw 48 projects to confine the front casing wall between the carrier and the head of this screw for sliding movement of the carrier.

The carrier 45 is provided with a relatively large opening 52 therethrough which registers with the viewing station when the carrier is at the viewing station end of its movement, see Figure 2, so that it does not interfere with the viewing of slides at the viewing station, this arrangement promoting compactness of the device by permitting the carrier to traverse the viewing station.

The carrier 45 is also provided at the viewing station corresponding end thereof with a portion 53 extending at a right angle thereto toward the rear casing wall 2, and the rear casing wall adjacent end 54 of this portion is turned at a right angle thereto in the direction toward the magazine end of the casing and is disposed in the plane of a slide 16 positioned on the slide positioning surface comprising the surfaces 42 for edgewise transferring engagement with the opposing edge of this slide.

Two spring members 55 are secured intermediately thereof, as designated at 56, on the carrier portion 53 adjacent the carrier 45 and are spaced transversely thereof and normal to the casing side walls 3 and 4 and are disposed respectively in the regions of these side walls. One portion of each of these spring members forms a ratchet claw spring arm 57 and extends from the secured portion of the spring member in adjacent relation with the carrier 45 and longitudinally of the path of reciprocation thereof in the direction toward the magazine and is provided at its magazine corresponding or free end with a ratchet claw 58 directed toward the viewing station.

The arms 57 respectively aline with the channels 29 of the magazine 14 when positioned in the casing and are adapted to pass respectively into these channels and over the slide at the end of the slide stack 15 adjoining the stack positioning surface comprising the surface portions 28, see Figure 7, and into edgewise transferring engaging relation with the edge of this slide at the viewing station remote side of the slide stack, see Figure 5, with movement of the carrier 45 in the direction toward the slide stack or toward the left in these figures.

The other portion of each of the spring members 55 forms a spring arm 59 and extends from the secured portion thereof lineally of the slide stack to the plane of a slide 16 positioned at the slide positioning surface comprising the surfaces 42 and is inclined from the secured portion thereof in the direction toward the slide stack and is provided at this slide plane with a U-shaped portion 61 facing in the direction toward the slide stack and in which the opposing edge portion of this slide is engageable for facewise positioning the slide at this edge portion during transfer of the slide as hereinafter described.

The cross member 21 is provided at the viewing station side thereof with guides 62 which face toward the viewing station axis 37 and extending lineally of the slide stack, are inclined from the ends thereof adjacent the spring arms 57 in the direction toward the viewing station axis, and these guides and the spring arms 59 form guides arranged in opposing relation lineally of the movement of the carrier 45 and extending lineally of the slide stack and adapted to guide the slides 16 therebetween as the slides are transferred lineally of the slide stack, these guides diverging in the direction away from the slide positioning surface comprising the surfaces 42 and the guide, comprising the spring arms 59, being resilient lineally of the movement of the carrier 45 so as to yield as a slide is transferred facewise lineally of the slide stack onto the slide positioning surface as hereinafter described.

A rock shaft 63 is disposed adjacent the closed or viewing station end of the casing and extends across between the side walls 3 and 4 and intermediate the front and rear walls 6 and 2 of the casing and is mounted for pivotal movement on the casing by means of semicircular bearings 64 on the main casing portion and bearing extensions 65 on the projections 7 of the front casing wall 6 confining the shaft therebetween as shown in Figure 8.

Two arms 66 are secured respectively on opposite ends of the rock shaft and the main portions thereof are disposed respectively on opposite sides of the transfer path of the slides 16, and thus are pivotally mounted for reciprocation lineally of the slide stack 15 and the viewing station axis 37. See Figures 2, 3 and 4. The outer or free ends of the arms are disposed in the region of the intermediate portion of the viewing station and these ends of the arms are provided with slide engaging lugs 67 projecting laterally thereof toward each other in overlying relation with opposite side edge portions of a slide 16 at the viewing station for transferring the slide lineally of the slide stack 15 as hereinafter described.

A bow spring 68, see particularly Figure 3, extends transversely of the shaft 63 and has its ends respectively engaged in a recess 69 on the inside of the front casing wall 6 and in another recess 71 on the end casing wall 5 and has the convex side of its intermediate portion facing the shaft. A short arm 72 is secured on the shaft in radial relation therewith and against the outer end of which the intermediate portion of the spring 68 is engageable for actuating the shaft and the arms 66 in their slide transferring direction or toward the slide positioning surface comprising the surfaces 42, and the arm 72 is so angularly related with the arms 66 as to have a substantially on center detent relation with the spring 68, see Figure 5, when the arms 66 are at the transfer stroke initiating end of their movement in which the slide engaging lugs 67 are disposed slightly beyond the plane of the end of the slide stack 15 which is engaged against the stack positioning surface comprising the surface portions 28. Radial lugs 73 on the arms 66 are engageable with the end casing wall 5 to establish the transfer stroke initiating end of their movement.

Extensions 74 are provided on opposite sides of the portion 53 of the carrier 45 and these extensions terminate in cam engaging surfaces 75 facing angularly of the arms 66 and abutment surfaces 76 facing in the direction of the rock shaft 63. See Figures 4, 5 and 6. The arms 66 are provided adjacent the rock shaft 63 with angularly facing abutment surfaces 77 disposed in opposing relation with the abutment surfaces 76, and the abutment surfaces 76 are engageable against the abutment surfaces 77 angularly of the pivotal axis of the arms 66, see Figure 6, to initiate the slide transfer stroke of these arms and thereby release the detent relation of the arms 72 and spring 68 with final movement of the carrier 45 in the direction away from the slide stack 15 or to the right in this figure, the spring 68 propelling the arms 66 with a snap-like action upon release of the detent relation to the end of their slide transfer stroke as shown in Figure 3.

The arms 66 are provided with radially extending angularly facing concave cam surfaces 78 which are opposedly related with the cam engaging surfaces 75 of the carrier 45 when the carrier is in the region of the end of its movement away from the slide stack 15, so that when the carrier is at this end of its movement and the arms 66 are positioned at the end of their slide transfer stroke, as shown in Figure 3, movement of the carrier toward the slide stack engages the cam engaging surfaces 75 with the cam surfaces 78 and moves the arms 66 to the transfer stroke initiating end of their movement, as shown in Figure 4, and establishes the detent relation of the spring 68 and arm 72, so that the arms are retained in this position as this movement of the carrier is continued and the cam engaging surfaces 75 pass beyond the cam surfaces 78. Figure 4 shows the cam engaging surfaces 75 just passing beyond the cam surfaces 78.

The extensions 46 of the carrier 45 are extended outwardly from the casing side walls 3 and 4 and are serrated to form finger engageable portions, see Figures 1 and 2, so that the carrier may be conveniently manually reciprocated, and the carrier and the spring members 55 constitute a slide transfer device reciprocable transversely of the slide stack 15 and the arms 66 and their rock shaft 63 constitute another slide transfer device reciprocable lineally of the slide stack.

In the position of the slide transfer mechanism shown in Figures 2 and 3, the carrier 45 is at the end of its movement in the region of the viewing station, or to the right, and the arms 66 are at the end of their slide transfer stroke adjacent the slide positioning surface comprising the positioning surfaces 42, a slide 16 from the slide stack 15 being positioned, as a result of a previous cycle of the slide transfer mechanism, in viewing position on the slide positioning surface and confined between this surface and the lugs 67 of the arms 66 by the spring 68. In this position of the carrier, the U-shaped portions 61 of the spring arms 59 are engaged with the opposing edge portion of this slide and the carrier portion 54 alines with the opposing edge of this slide.

Upon movement of the carrier 45 toward the slide stack or to the left from its position as shown in Figures 2 and 3, the carrier portion 54 pushes the slide at the viewing station along the slide positioning surface toward the slide stack and between the cross member and the rear casing wall 2, the arms 66 being raised from the slide at the initiation of this movement of the carrier by means of the cam engaging surfaces 75 of the carrier acting against the cam surfaces 78 of the arms 66 and actuating these arms against the influence of the spring 68. This movement of the carrier causes the slide from the viewing station to be moved edgewise between the slide stack springs 35 and the adjoining end of the slide stack and onto this end of the same, and during the first portion of this movement of the carrier 45, the cam engaging surfaces 75 of the carrier continue to act against the cam surfaces 78 of the arms 66 and move the arms to the slide transfer stroke initiating end of their movement and establish the detent relation of the spring 68 and arm 72 after which the cam engaging surfaces pass beyond the cam surfaces 78. Figure 4 shows the slide transfer mechanism with the carrier 45 midway of its stroke toward the slide stack in which position the slide is partially transferred onto the stack and the arms 66 are at the slide transfer stroke initiating end of their movement, and Figure 5 shows the mechanism with the carrier at the end of its stroke toward the slide stack with the slide fully transferred onto the slide stack.

In addition, as the carrier 45 is moved toward the slide stack 15 or to the left from its position as shown in Figures 2 and 3, the ratchet claw spring arms 57 pass into the magazine channels 29 and over the slide at the end of the slide stack adjoining the stack positioning surface of the magazine comprising the surface portions 28, see Figure 4, and at the end of this carrier movement the claws 58 of these spring arms move under the bias of these arms into edgewise transferring engaging relation with the edge of this slide at the viewing station remote side of the slide stack as shown in Figure 5, the extension of the channels 29 by the extrusions 31 of the closed end wall 32 of the magazine accommodating for this position of the claws 58.

Upon movement of the carrier 45 toward the viewing station or to the right from its position as shown in Figure 5, the arms 57, by reason of the claws 58 thereof being engaged with the viewing station remote edge of the last mentioned slide, withdraw the slide edgewise of the stack to the viewing station as shown in Figure 6 where, depending upon the position of the viewing device, the slide may remain in the position shown in Figure 6 or may fall toward the slide positioning surface comprising the surfaces 42 and engage between the opposing guides comprising the guides 62 and the spring arms 59, and during the final movement of the carrier in this direction, the abutment surfaces 76 of the carrier engage the abutment surfaces 77 of the arms 66 and initiate the slide transfer stroke of these arms and release the detent relation of the arm 72 and the spring 68, whereupon the spring 68 actuates the arms on their slide transfer stroke toward the slide positioning surface comprising the surfaces 42 and transfers the slide just withdrawn from the stack, by facewise engagement of the lugs 67 therewith, lineally of the slide stack onto the slide position surface and into viewing position, this completing the cycle of the slide transfer mechanism with the transfer mechanism returned to the position thereof as shown in Figures 2 and 3.

As a slide is transferred lineally of the slide stack, it engages the opposing guides, comprising the guides 62 on the cross member 21 and the inclined spring arms 59, which serve to prevent the slide from cocking too much with possible jamming of the slide, particularly when the slide moves of its own accord lineally of the slide stack as when the device is held with the front casing wall 6 uppermost, and the spring arms 59 yield as a slide is transferred by the arms 66 and then return to normal position as the U-shaped portions 61 of the arms engage the opposing edge portions of the slide.

Successive reciprocations of the carrier member 45 effect convenient sequential transfer of the slides from one end of the slide stack to the viewing position and then onto the other end of the stack, it being observed that the slides are desirably returned to the stack in the same order as that in which they are withdrawn therefrom.

Referring to Figures 9 and 10, the slide viewer illustrated therein is the same in all respects as that illustrated in Figures 1 to 8 except that spring means is provided for actuating or assisting in actuating the carrier 45 in the direction in which it transfers a slide from the slide stack 15 in order to render manual actuation of the carrier more convenient and to overcome or partially overcome the resistance encountered when the abutment surfaces 76 of the carrier engage the abutment surfaces 77 of the arms 66 pursuant to releasing the detent relation of the arm 72 and the spring 68 at the end of this movement of the carrier.

This spring means is shown in Figures 9 and 10 as comprising two tension springs 79 respectively disposed adjacent the casing side walls 3 and 4 and extending longitudinally of the movement of the carrier 45 and each spring having one end thereof anchored, as designated at 80, on the front casing wall 6 adjacent the casing end wall 5 and having the other end thereof secured, as designated at 81, on the slide stack associated end of the carrier to urge the carrier in the direction in which it transfers a slide from the slide stack. The springs 79 are enclosed within inwardly facing channels 82 on the front casing wall 6 and extending longitudinally of the movement of the carrier and formed by corresponding extending extrusions 83 of the front casing wall.

While I have thus described my invention, I do not wish to be limited to the precise details described, as changes may be readily made without departing from the spirit of my invention, but having thus described my invention, I claim as new and desire to secure by Letters Patent the following:

1. In a device of the character described, the combiation of positioning means against which an end of a stack of facewise engaged slides is yieldably urged, and slide transfer means defining a generally U-shaped slide transfer path and operative to sequentially transfer slides from said end of said stack and onto the other end of said stack and comprising first and second slide transfer devices respectively reciprocable transversely and lineally of said stack, said first transfer device being operative to transfer slides edgewise transversely of said stack from and onto said stack respectively with opposite movements thereof and said second transfer device being operative to transfer slides facewise lineally of said stack, a spring device for actuating said second transfer device in its slide transferring direction, releasable detent means operative to retain said second transfer device at the slide transfer stroke initiating end of its movement, detent releasing means under the control of said first transfer device and operative to release said detent means with final movement of said first transfer device in the direction in which it transfers a slide from said stack, and means under the control of said first transfer device for actuating said second transfer device to said transfer stroke initiating end of its movement with movement of said first transfer device in the direction in which it transfers a slide onto said stack.

2. In a device of the character described, the combination of positioning means against which an end of a stack of facewise engages slides is yieldably urged, and slide transfer means defining a generally U-shaped slide transfer path and operative to sequentially transfer slides from said end of said stack and onto the other end of said stack and comprising a first transfer device reciprocable transversely of said stack and operative to transfer slides edgewise transversely of said stack from and onto said stack respectively with opposite movements thereof and a second slide transfer device pivotally mounted for reciprocation lineally of said stack and operative to transfer slides facewise lineally of said stack, spring means operative on said second transfer device eccentrically thereof for actuating the same in its slide transferring direction and having substantially on center detent relation with this transfer device when this transfer device is at the slide transfer stroke initiating end of its movement, abutment means operative between said transfer devices angularly of said pivotal axis to initiate the slide transfer stroke of said second transfer device and thereby release said detent relation with final movement of said first transfer device in the direction in which it transfers a slide from said stack, and cam means operative between said transfer devices to actuate said second transfer device to said transfer stroke initiating end of its movement with movement of said first transfer device in the direction in which it transfers a slide onto said stack.

3. In a device of the character described, the combination of positioning means against which an end of a stack of facewise engaged slides is yieldably urged, and slide transfer means defining a generally U-shaped slide transfer path at one side of said stack and operative to sequentially transfer slides from said end to said stack and onto the other end of said stack and comprising first and second slide transfer devices respectively reciprocable transversely and lineally of said stack, said first transfer device comprising ratchet claw spring arm means extending lineally of the movement of said first transfer means and operative to pass over the slide at said first mentioned end of said stack into engaging relation with the edge of said slide at the other side of said stack and to withdraw said slide edgewise from the stack to a first position at said first mentioned stack side and stacking means operative to engage the edge corresponding with said first mentioned stack side of a slide disposed in a second position edgewise with respect to and in the region of said other stack end and to transfer this slide edgewise onto said other stack end with movement of said first transfer means in the direction opposite its slide withdrawing direction, said second transfer device being operative to transfer a slide facewise from said first position to said second position, and means operative to effect actuation of said transfer devices in timed relation.

4. In a device of the character described, the combination recited in claim 3 and further including in combination, said timed actuation effecting means comprising a spring device for actuating said second transfer device in its slide transferring direction, releasable detent means operative to retain said second transfer device at the slide transfer stroke initiating end of its movement, detent releasing means under the control of said first transfer device and operative to release said detent means with final movement of said first transfer device in the direction in which it transfers a slide from said stack, and means under the control of said first transfer device for actuating said second transfer device to said transfer stroke initiating end of its movement with movement of said first transfer device in the direction in which it transfers a slide onto said stack.

5. In a device of the character described, the combination recited in claim 3 and further including in combination, said second transfer device being pivotally mounted for reciprocation lineally of said stack, and said timed actuation effecting means comprising spring means operative on said second transfer device eccentrically thereof for actuating the same in its slide transferring direction and having substantially on center detent relation with this transfer device when this transfer device is at the slide transfer stroke initiating end of its movement, abutment means operative between said transfer devices angularly of said pivotal axis to initiate the slide transfer stroke of said second transfer device and thereby release said detent relation with final movement of said first transfer device in the direction in which it transfers a slide from said stack, and cam means operative between said transfer devices to actuate said second transfer device to said transfer stroke initiating end of its movement with movement of said first transfer device in the direction in which it transfers a slide onto said stack.

6. In a device of the character described, the combination of an elongated casing, viewing station forming means on said casing and having its axis transverse to and in the region of one end of said casing and providing a slide positioning surface within said casing and disposed normal to said axis, a slide magazine removably predeterminately positionable in said casing in the region of the other end thereof and adapted to contain a stack of facewise engaged slides and provided therein with stack positioning means against which one end of said stack is engageable and with spring means engageable against the other end of said stack and operative to press said stack against said stack positioning means and adapted to permit a slide to be inserted edgewise between it and said second mentioned stack end, said magazine, when positioned in said casing, positioning said stack at the side of said viewing station with the slides disposed normal to said axis and with said second mentioned stack end in the region of said positioning surface and with said positioning surface facing in the direction of said first mentioned stack end, and slide transfer means defining a generally U-shaped slide transfer path and operative to sequentially transfer slides from said first mentioned stack end onto said positioning surface and from said positioning surface onto said second mentioned stack end and comprising first and second slide transfer devices mounted on said casing for reciprocation respectively longitudinally of said casing and lineally of said stack.

7. In a device of the character described, the combination recited in claim 6 and further including in combination, said other end of said casing being provided with an opening through which said magazine is insertable in and removable from said casing, releasable locating means operative between said casing and magazine to locate said magazine longitudinally within said casing and engageable and disengageable with movement of said magazine laterally of said casing, and spring means operative between said casing and magazine laterally of said casing to normally maintain said locating means in engagement.

8. In a device of the character described, the combination recited in claim 6 and further including in combination, said other end of said casing being provided with an opening through which said magazine is insertable in and removable from said casing and said casing being provided internally thereof with opposing shoulders spaced longitudinally of said casing and adapted to confine said magazine therebetween and one of said shoulders being disposed at a side of said opening and facing inwardly thereof and into and out of engaging relation with which said magazine is movable laterally of said casing, and spring means on said casing and operative between said casing and magazine laterally of said magazine to normally maintain said magazine in engaging relation with said shoulder.

ARTHUR C. MUELLER.

REFERENCES CITED

The following references are of record in the file of this patent:

UNITED STATES PATENTS

| Number | Name | Date |
|---|---|---|
| 786,883 | Edmonds | Apr. 11, 1905 |
| 1,002,078 | Paoli | Aug. 29, 1911 |
| 1,146,207 | Rucker | July 13, 1915 |

FOREIGN PATENTS

| Number | Country | Date |
|---|---|---|
| 436,094 | Germany | Oct. 23, 1926 |
| 667,104 | France | Oct. 12, 1929 |